United States Patent
Lai

(10) Patent No.: US 8,436,574 B2
(45) Date of Patent: May 7, 2013

(54) SOLAR POWER SUPPLY SYSTEM AND DRIVING METHOD OF SAME

(75) Inventor: Chih-Chen Lai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 638 days.

(21) Appl. No.: 12/765,809

(22) Filed: Apr. 22, 2010

(65) Prior Publication Data

US 2011/0156653 A1    Jun. 30, 2011

(30) Foreign Application Priority Data

Dec. 30, 2009  (TW) .............................. 98145690 A

(51) Int. Cl.
*H02J 7/00*    (2006.01)
(52) U.S. Cl.
USPC ........................................................ 320/101
(58) Field of Classification Search .................... 320/101
See application file for complete search history.

(56) References Cited

U.S. PATENT DOCUMENTS

| | | | | |
|---|---|---|---|---|
| 5,025,202 A | * | 6/1991 | Ishii et al. | 320/101 |
| 6,057,665 A | * | 5/2000 | Herniter et al. | 320/101 |
| 6,384,570 B2 | * | 5/2002 | Matsuyama | 320/101 |
| 6,462,507 B2 | * | 10/2002 | Fisher, Jr. | 320/101 |
| 8,040,102 B2 | * | 10/2011 | Kao et al. | 320/101 |

* cited by examiner

*Primary Examiner* — Ramy Ramadan
(74) *Attorney, Agent, or Firm* — Altis Law Group, Inc.

(57) ABSTRACT

A solar power supply system includes a load device, a solar panel that converts light energy into electrical energy, an energy storage device storing the electrical energy from the solar panel, a charge/discharge control device, and a transformer device. The charge/discharge control device selects one of the energy storage device and the solar panel as an operation power supply to the charge/discharge control device and generates an output voltage. The transformer device transforms the output voltage of the charge/discharge control device into a driving voltage to drive the load device. A feedback circuit generates a feedback signal according to an actual power consumption of the load device. A power detector detects an instant output power of the charge/discharge control device. A power regulator minimizes the output power of the charge/discharge control device according to the instant output power of the charge/discharge control device and the actual power consumption of the load device.

20 Claims, 2 Drawing Sheets

SOLAR POWER SUPPLY SYSTEM AND DRIVING METHOD OF SAME

BACKGROUND

1. Technical Field

The present disclosure relates solar power supply systems, and more particularly, to solar power supply systems and driving method capable of automatically adjusting output power of the solar power supply systems according to power consumption of a load device.

2. Description of Related Art

Solar cells are employed to convert incident solar radiation energy into electrical energy. Solar power supply systems typically employ a solar cell as a power source to drive a load device. Moreover, solar power supply systems also include a transformer device for transforming the electrical energy from the solar cell into a driving voltage to drive a load device. However, the transformer device does not automatically adjust its output power according to power consumption of the load device or different load devices. Therefore, transformation efficiency of the transformer device is low and the solar power supply systems using the transformer device have a low efficiency.

Therefore, a new solar power supply system and a driving method of the same are desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various inventive embodiments of the present disclosure in detail, wherein like numerals refer to like elements throughout.

Figure 1:
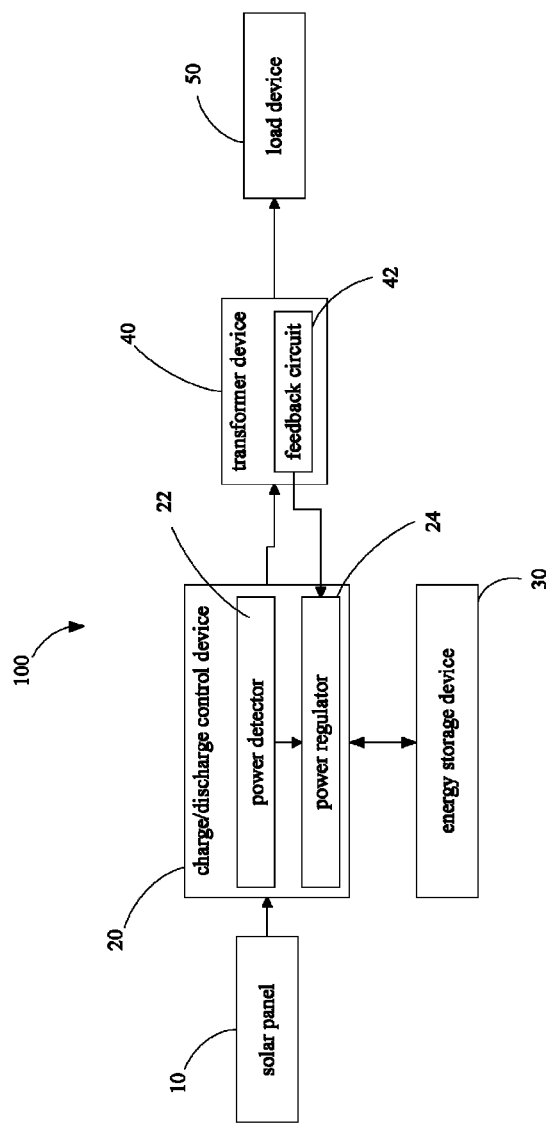
FIG. 1 is a block diagram of a solar power supply system according to one embodiment of the present disclosure.

Referring to FIG. 1, a solar power supply system 100 according to one embodiment of the present disclosure is shown. The solar power supply system 100 includes a solar panel 10, a charge/discharge control device 20, an energy storage device 30, a transformer device 40, and a load device 50.

The solar panel 10 collects light energy and converts the light energy into electrical energy. The energy storage device 30 stores the electrical energy from the solar panel 10, where the electrical energy can serve as a backup power supply to drive the load device 50. The charge/discharge control device 20 controls a charge process of the energy storage device 30 if the energy storage device 30 is fully charged. The charge/discharge control device 20 controls a discharge process of the energy storage device 30 if the solar panel 10 normally works and generates an electrical energy.

The transformer device 40 is connected between the charge/discharge control device 20 and the load device 50. The transformer device 40 transforms an output voltage provided from the charge/discharge control device 20 into a driving voltage and provides the driving voltage to drive the load device 50.

The transformer device 40 includes a feedback circuit 42. The feedback circuit 42 detects an output power of the transformer device 40 and generates a feedback signal according to the output power of the transformer device 40. The output power of the transformer device 40 is approximately equal to a power consumption of the load device 50. That is, the feedback signal also denotes power consumptions of the load devices 50. The transformer device 40 provides different output power to different load devices 50, correspondingly. In one embodiment, the feedback circuit 42 detects the driving voltage and a corresponding driving current outputted from the transformer device 40 to the load device 50, and then calculates the output power of the transformer device 40 according to the driving voltage and the corresponding driving current. In one embodiment, the transformer device 40 can be a direct current (DC) to DC converter or a DC to alternating current (AC) converter.

The charge/discharge control device 20 is connected between the solar panel 10 and the energy storage device 30. The charge/discharge control device 20 receives the electrical energy from the solar panel 10 and transforms the electrical energy into a charge voltage for charging the energy storage device 30 until the energy storage device 30 is fully charged. The charge/discharge control device 20 also connects to the transformer device 40 and provides the output voltage to the transformer device 40. The charge/discharge control device 20 selects one of the energy storage devices 30 and the solar panel 10 as its operation power supply.

The charge/discharge control device 20 includes a power detector 22 and a power regulator 24. The power regulator 24 connects to both the power detector 22 and the feedback circuit 42.

The power detector 22 detects an instant output power of the charge/discharge control device 20. In one embodiment, the power detector 22 instantly detects the output voltage and a corresponding output current of the charge/discharge control device 20, and then calculates the instant output power of the charge/discharge control device 20 according the output voltage and the corresponding output current of the charge/discharge control device 20.

The power regulator 24 receives not only the instant output power of the charge/discharge control device 20 from the power detector 22, but also the feedback signal from the feedback circuit 42. In one embodiment, when different load devices 50 are connected to the transformer device 40, the power regulator 24 automatically minimizes the output power of the charge/discharge control device 40 according to the instant output power of the charge/discharge control device 20 and the power consumptions of the load devices 50. In this embodiment, the power regulator 24 reasonably adjusts the output voltage and the corresponding output current of the charge/discharge control device 20 according to the instant output power of the charge/discharge control device 20 and the feedback signal to adjust the output power of the charge/discharge control device 20.

Alternatively, when the load device 50 works from a first operation mode to a second operation mode to arise different power consumption, the power regulator 24 can also automatically minimize the output power of the charge/discharge control device according to the instant output power of the charge/discharge control device 20 and the feedback signal.

Because the output voltage of the charge/discharge control device 20 can automatically be adjusted according to the power consumption of the load device 50, that is, the power supply to the transformer device 40 can be adjusted according to the power consumption of the load device 50. Therefore, the transforming efficiency of the transformer device 40 is improved. Furthermore, because the output power of the charge/discharge control device 20 is automatically minimized according to the power consumption of the load device 50, the transforming efficiency of the charge/discharge control device 20 is also improved. Thus, by employing the charge/discharge control device 20 and the transformer device 40, the solar power supply system 100 saves power.

Figure 2:
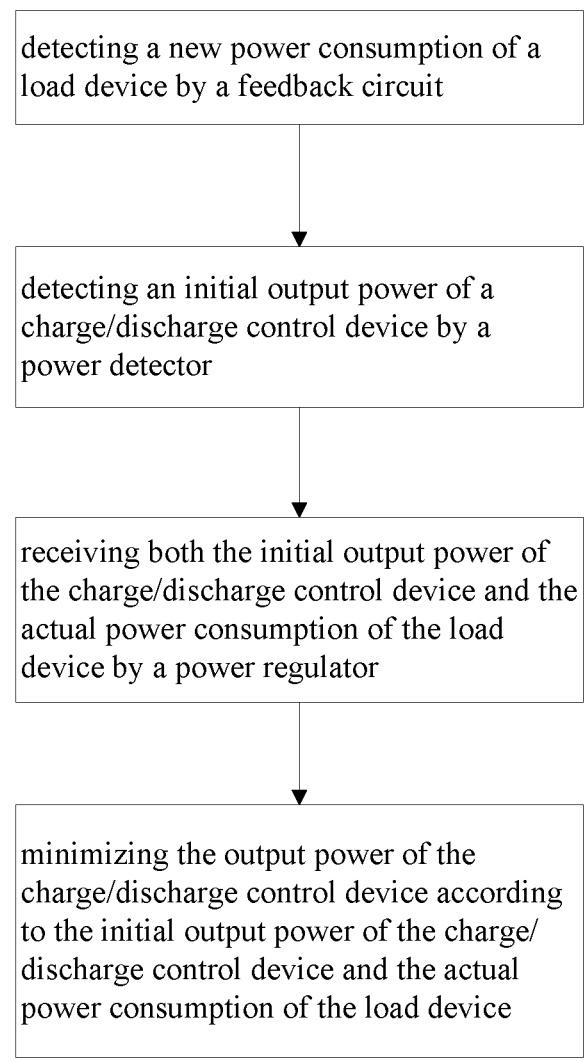
FIG. 2 is a flow chart showing a driving method of the solar power supply system of FIG. 1

Referring to FIG. 2, a driving method of the solar power supply system 100 is described as following.

First, the feedback circuit 42 detects the power consumption of the load device 50. In one embodiment, when a new load device 50 is connected to the transformer device 40, the feedback circuit 42 detects the replacement of the load device 50 by detecting the actual power consumption of new load device 50 and generates a corresponding feedback signal. In this embodiment, the feedback circuit 42 detects a driving voltage and a driving current output from the transformer device 40. The feedback circuit 42 calculates the actual power consumption of the new load device 50 by multiplying the driving voltage and a driving current of transformer device 40.

Second, the power detector 22 detects an initial output power of the charge/discharge control device 20. In one embodiment, after the load device 50 is replaced by the new load device 50, the power detector 22 detects an initial output voltage and a corresponding initial output current of the charge/discharge control device 20. The power detector 22 calculates the initial output power of the charge/discharge control device 20 by multiplying the initial output voltage and the corresponding initial output current of the charge/discharge control device 20.

Third, the power regulator 24 of the charge/discharge control device 20 receives both the initial output power of the charge/discharge control device 20 and the actual power consumption of the new load device 50. In this embodiment, the power regulator 24 receives the initial output power of the charge/discharge control device 20 from the power detector 22 of the charge/discharge control device 20. The power regulator 24 receives the feedback signals from the feedback circuit 42. The feedback signals denote the actual power consumption of the new load device 50.

Fourth, the power regulator 24 automatically minimizes the output power of the charge/discharge control device 20 according to the initial output power of the charge/discharge control device 20 and the actual power consumption of the new load device 50. In this embodiment, the power regulator 24, reasonably adjusts the initial output voltage and the corresponding initial output current of the charge/discharge control device 20 according to the initial output power of the charge/discharge control device 20, and the new power consumption of the load device 50 to minimize the output power of the charge/discharge control device 20.

In this embodiment, when the transformer device 40 connects to an old load device 50, an output voltage and an output current of the charge/discharge control device 20 provided to the transformer device 40 are defined as a primary output voltage and a primary output current. An output power calculated by multiplying the primary output voltage and the primary output current is defined as a primary output power of the charge/discharge control device 20.

When the transformer device 40 connects to a new load device 50 with less power consumption, the transformer device 40 provides a new output power to drive the new load device 50. The feedback circuit 42 generates a new feedback signal according to the new output power and sends the new feedback signal to the power regulator 24. The new feedback signal also denotes the new power consumption of the new load device 50.

After the new output power provided by the transformer device 40 approximately reaches a constant value, the power detector 22 detects an initial output voltage and an initial output current of the charge/discharge control device 20 to calculate an initial power of the charge/discharge control device 20.

After that, the power regulator 24 slightly decreases the initial output voltage of the charge/discharge control device 20 to a reference output voltage and provides the reference output voltage to the transformer device 40. After the new output power provided by the transformer device 40, approximately reaches the constant value again, the power detector 22 detects a reference current of the charge/discharge control device 20 corresponding to the reference output voltage. Then the power detector 22 calculates a reference power of the charge/discharge control device 20 by multiplying the reference current and the reference output voltage.

If the reference power is less than the initial output power, the power regulator 24 gradually decreases the initial output voltage of the charge/discharge control device 20 until the calculated reference power reaches a minimum value. On the contrary, if the reference power is larger than the initial output power, the power regulator 24 gradually increases the initial output voltage of the charge/discharge control device 20 until the calculated reference power reaches a minimum value.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A solar power supply system comprising:
 a load device;
 a solar panel that converts light energy into electrical energy;
 an energy storage device storing the electrical energy from the solar panel;
 a charge/discharge control device comprising a power detector and a power regulator, the charge/discharge control device selecting one of the energy storage device and the solar panel as an operation power supply to the charge/discharge control device and generating an output voltage according to the operation power supply; and
 a transformer device comprising a feedback circuit, the transformer device transforming the output voltage of the charge/discharge control device into a driving voltage to drive the load device,
 wherein the feedback circuit generates a feedback signal according to an actual power consumption of the load device, the power detector detects an instant output power of the charge/discharge control device, the power regulator automatically minimizes the output power of the charge/discharge control device according to the instant output power of the charge/discharge control device and the actual power consumption of the load device.

2. The solar power supply system of claim 1, wherein a charge process of the energy storage device is controlled by the charge/discharge control device if the energy storage device is fully charged.

3. The solar power supply system of claim 1, wherein a discharge process of the energy storage device is controlled by the charge/discharge control device if the solar panel normally works and generates electrical energy.

4. The solar power supply system of claim 1, wherein the feedback circuit detects an output power of the transformer device and generates the feedback signal according to the output power of the transformer device.

5. The solar power supply system of claim 1, wherein the transformer device is a direct current (DC) to DC transformer or a DC to alternating current (AC) transformer.

6. The solar power supply system of claim 4, wherein the feedback circuit detects the driving voltage and a corresponding driving current outputted form transformer device to the load device, and then calculates the output power of the transformer device according to the driving voltage and the corresponding driving current.

7. The solar power supply system of claim 4, wherein the output power of the transformer device is approximately equal to a power consumption of the load device.

8. The solar power supply system of claim 1, wherein the charge/discharge control device receives the electrical energy from the solar panel and transforms the electrical energy into a charge voltage for charging the energy storage device until the energy storage device is fully charged.

9. The solar power supply system of claim 1, wherein the power regulator connects to the power detector and the feedback circuit.

10. The solar power supply system of claim 1, wherein the power detector instantly detects an instant output voltage and a corresponding output current of the charge/discharge control device, and calculates the instant output power of the charge/discharge control device according the instant output voltage and the corresponding output current of the charge/discharge control device.

11. A driving method of the solar power supply system comprising:
   providing a load device;
   collecting and inverting light energy into electrical energy by a solar panel;
   storing the electrical energy from the solar panel by a energy storage device;
   selecting one of the energy storage device and the solar panel as an operation power supply to the charge/discharge control device;
   generating an output voltage by the a charge/discharge control device;
   transforming the output voltage of the charge/discharge control device into a driving voltage by a transformer device to drive the load device;
   generating a feedback signal by a feedback circuit according to an actual power consumption of the load device;
   detecting an instant output power of the charge/discharge control device by a power detector; and
   automatically minimizing the output power of the charge/discharge control device by a power regulator according to the instant output power of the charge/discharge control device and the actual power consumption of the load device.

12. The driving method of claim 11, wherein a charge process of the energy storage device is controlled by the charge/discharge control device if the energy storage device is full charged.

13. The driving method of claim 12, wherein the charge/discharge control device receives the electrical energy from the solar panel and transforms the electrical energy into a charge voltage for charging the energy storage device until the energy storage device is fully charged.

14. The driving method of claim 11, wherein a discharge process of the energy storage device is controlled by the charge/discharge control device if the solar panel normally works and generates electrical energy.

15. The driving method of claim 11, wherein the feedback circuit detects an output power of the transformer device and generates the feedback signal according to the output power of the transformer device.

16. The driving method of claim 15, wherein the feedback circuit detects the driving voltage and a corresponding driving current outputted form transformer device to the load device, and then calculates the output power of the transformer device according to the driving voltage and the corresponding driving current.

17. The driving method of claim 15, wherein the output power of the transformer device is approximately equal to a power consumption of the load device.

18. The driving method of claim 11, wherein the transformer device is a direct current (DC) to DC transformer or a DC to alternating current (AC) transformer.

19. The driving method of claim 11, wherein the power detector instantly detects an instant output voltage and a corresponding output current of the charge/discharge control device, and calculates the instant output power of the charge/discharge control device according the instant output voltage and the corresponding output current of the charge/discharge control device.

20. The driving method of claim 11, wherein the power regulator gradually decreases or increases the output voltage of the charge/discharge control device until the output power of the charge/discharge control device reaches a minimum value.

* * * * *